United States Patent
Hayashi et al.

(10) Patent No.: US 6,798,558 B2
(45) Date of Patent: Sep. 28, 2004

(54) OPTICAL CLOCK MULTIPLIER AND METHOD THEREOF

(75) Inventors: Michiaki Hayashi, Saitama (JP); Tomohiro Otani, Saitama (JP); Masatoshi Suzuki, Saitama (JP)

(73) Assignee: KDDI Corporation, Tokyo (JP)

( * ) Notice: Subject to any disclaimer, the term of this patent is extended or adjusted under 35 U.S.C. 154(b) by 0 days.

(21) Appl. No.: 10/465,366

(22) Filed: Jun. 18, 2003

(65) Prior Publication Data

US 2004/0001245 A1 Jan. 1, 2004

(30) Foreign Application Priority Data

Jul. 1, 2002 (JP) ........................................ 2002-191860

(51) Int. Cl.[7] ............................. G02F 1/01; H04B 10/12
(52) U.S. Cl. ...................... 359/279; 398/147; 398/152; 398/154; 398/155
(58) Field of Search ................................ 359/238, 251, 359/279, 283, 304; 398/147, 152, 154, 155, 184, 188

(56) References Cited

U.S. PATENT DOCUMENTS 6,459,518 B1 * 10/2002 Suzuki et al. ............... 398/152

* cited by examiner

Primary Examiner—Hung Xuan Dang
Assistant Examiner—Tuyen Tra
(74) Attorney, Agent, or Firm—Christie, Parker & Hale, LLP

(57) ABSTRACT

An optical clock multiplier comprises a phase modulator (12) to shift a phase in pulse duration of an input optical clock pulse by $\pi$, a polarization mode dispersion device (16) having a predetermined time difference between first and second polarizations orthogonal to each other to divide an output light from the phase modulator into the first and second polarization components, and a polarization device (20) to extract one of polarization components in a third polarization practically inclined at an angle of 45° against the first polarization and a fourth polarization orthogonal to the third polarization out of the output light from the polarization mode dispersion device.

25 Claims, 7 Drawing Sheets

OPTICAL CLOCK MULTIPLIER AND METHOD THEREOF

CROSS REFERENCE TO RELATED APPLICATIONS

This application claims priority to Japanese Patent Application No. 2002-191860, filed Jul. 1, 2002, the entire contents of which are incorporated herein by reference.

1. Field of the Invention

This invention generally relates to an optical clock multiplier and method thereof and more specifically relates to an optical clock multiplier to double a frequency of an input optical clock and method thereof.

2. Background of the Invention

As an optical clock multiplier, a configuration to use a Mach-Zehnder interference system is well known. A configuration of this system is a to divide an input optical clock pulse into two portions, one portion is delayed from the other for a time equivalent to one half of a frequency of the input optical clock pulse and the other portion is amplitude-adjusted, and to combine the two portions.

Another well-known configuration is to input an optical clock pulse of linear polarization at an incident angle of 45° against a birefringent medium having a differential group delay (DGD) corresponding to one half of a frequency of the input optical clock pulse to generate two polarization components temporally different from each other and extract the same polarization component of an angle of 45° from both polarization components.

However, in these configurations, a pulse width of the multiplied output optical pulse is equivalent to that of the input optical clock pulse. Therefore, all of the conventional systems have to provide a short pulse light source to generate an optical clock whose optical pulse width is one half of a desired optical pulse width of an output optical clock. The more the frequency rises, the more it becomes difficult to provide such a short pulse light source.

As a means to shorten an optical pulse width, a configuration to serially connect electroabsorption optical modulators (EA modulators) is well known.

Since the conventional system utilizing a Mach-Zehnder interference system uses a Mach-Zehnder interferometer, it could be rather unstable. That is, it is necessary to control polarizations of lights propagating on both arms so that both polarizations become identical after combined together. Furthermore, a relative phase difference between both arms must be accurately kept within half a wavelength or less. These restrictions also lead to manufacturing difficulties in production.

In a conventional configuration to use a birefringent medium, an input optical clock pulse must be input to the birefringent medium in such a condition that its polarization angle becomes precisely 45° to the birefringent medium. To obtain the stable operation, polarization controllers should be disposed in front and back of the birefringent medium.

When to shorten an optical pulse width using serially connected EA modulators of multi-stage, an optical amplifier is required to compensate attenuation due to the EA modulators. In an erbium-doped optical fiber amplifier generally used as an optical amplifier, a phase fluctuates easily and thus phase fluctuation (i.e. jitter and wander) of an optical pulse is likely to occur. Accordingly, it is necessary to dispose a circuit structure for automatically adjusting a phase of a modulating signal applied to the EA modulator to compensate a phase difference between the respective stages. This makes the configuration much complicated.

Moreover, in the multi-stage connection of EA modulators, it is extremely difficult to flexibly adjust an optical pulse width. Also, wavelength dependency is quite severe.

SUMMARY OF THE INVENTION

An optical clock multiplier according to the invention comprises a phase modulator to shift a phase in pulse duration of an input optical clock pulse by $\pi$, a polarization mode dispersion device, having a predetermined time difference between first and second polarizations orthogonal to each other, to divide an output light from the phase modulator into the first and second polarization components, and a polarization device to extract one of polarization components in a third polarization inclined substantially at an angle of 45° against the first polarization and a fourth polarization orthogonal to the third polarization out of the output light from the polarization mode dispersion device.

An optical clock multiplying method according to the invention comprises steps of shifting a phase in pulse period or pulse duration of an input optical clock pulse by $\pi$; dividing the input optical clock pulse whose phase is shifted at the phase shifting step into first and second polarization components orthogonal to each other with a polarization mode dispersion device having a predetermined time difference between the first and second polarizations; and extracting one of polarization components of a third polarization inclined substantially at an angle of 45° against the first polarization and a fourth polarization orthogonal to the third polarization out of the first and second polarization components divided at the polarization dividing step.

An optical clock multiplier according to the invention comprises a CW light source to generate a CW light of a first wavelength, a phase modulator, to which an input optical clock pulse of a second wavelength different from the first wavelength and the output light from the CW light source enter, to give a phase difference of n between pulse duration and non-pulse duration of the input optical clock pulse to the CW light, a polarization mode dispersion device having a predetermined time difference between first and second polarizations orthogonal to each other to divide the light of the first wavelength output from the phase modulator into the first and second polarization components, and a polarization device to extract one of polarization components in a third polarization inclined substantially at an angle of 45° against the first polarization and a fourth polarization orthogonal to the third polarization out of the light of the first wavelength output from the polarization mode dispersion device.

An optical clock multiplying method according to the invention comprises a CW light generating step in which a CW light source generates a CW light of a first wavelength, a phase modulating step in which a phase modulator receives an input optical clock pulse of a second wavelength different from the first wavelength and CW light output from the CW light source and gives a phase difference of n between pulse duration and non-pulse duration of the input light clock pulse to the CW light, a polarization dividing step in which a polarization mode dispersion device having a predetermined time difference between first and second polarizations orthogonal to each other divides the light of the first wavelength output from the phase modulator into the first and second polarization components, and a step for extracting one of polarization components in a third polarization inclined substantially at an angle of 45° to the first polarization and a fourth polarization orthogonal to the third polarization out of the light of the first wavelength output from the polarization mode dispersion device.

BRIEF DESCRIPTION OF THE DRAWINGS

The above and other objects, features and advantages of the present invention will be apparent from the following detailed description of embodiments of the invention in conjunction with the accompanying drawings, in which.

DETAILED DESCRIPTION

Embodiments of the invention are explained below in detail with reference to the drawings.

Figure 1:
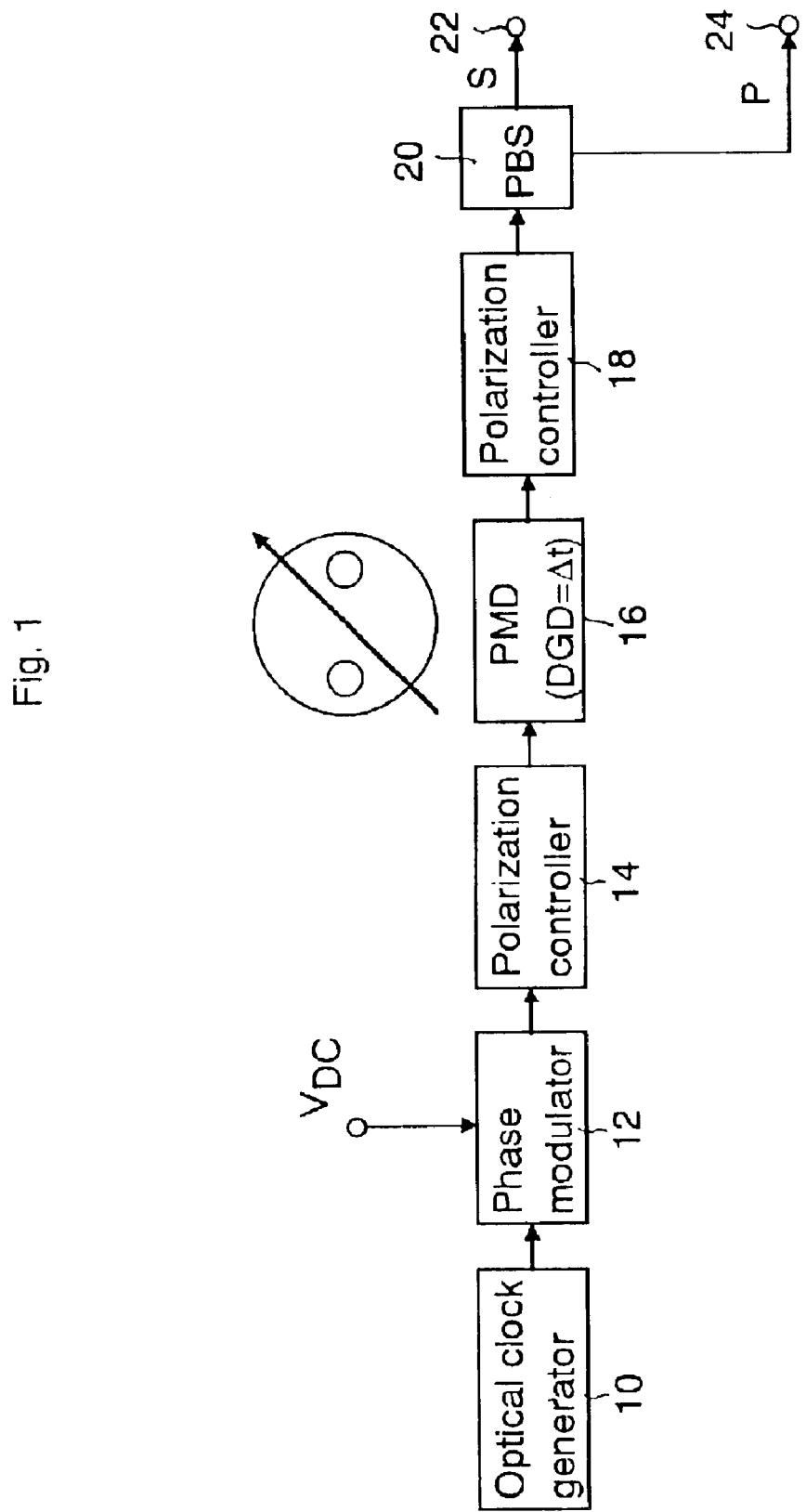
FIG. 1 shows a schematic block diagram of an embodiment according to the invention.
Figure 2:
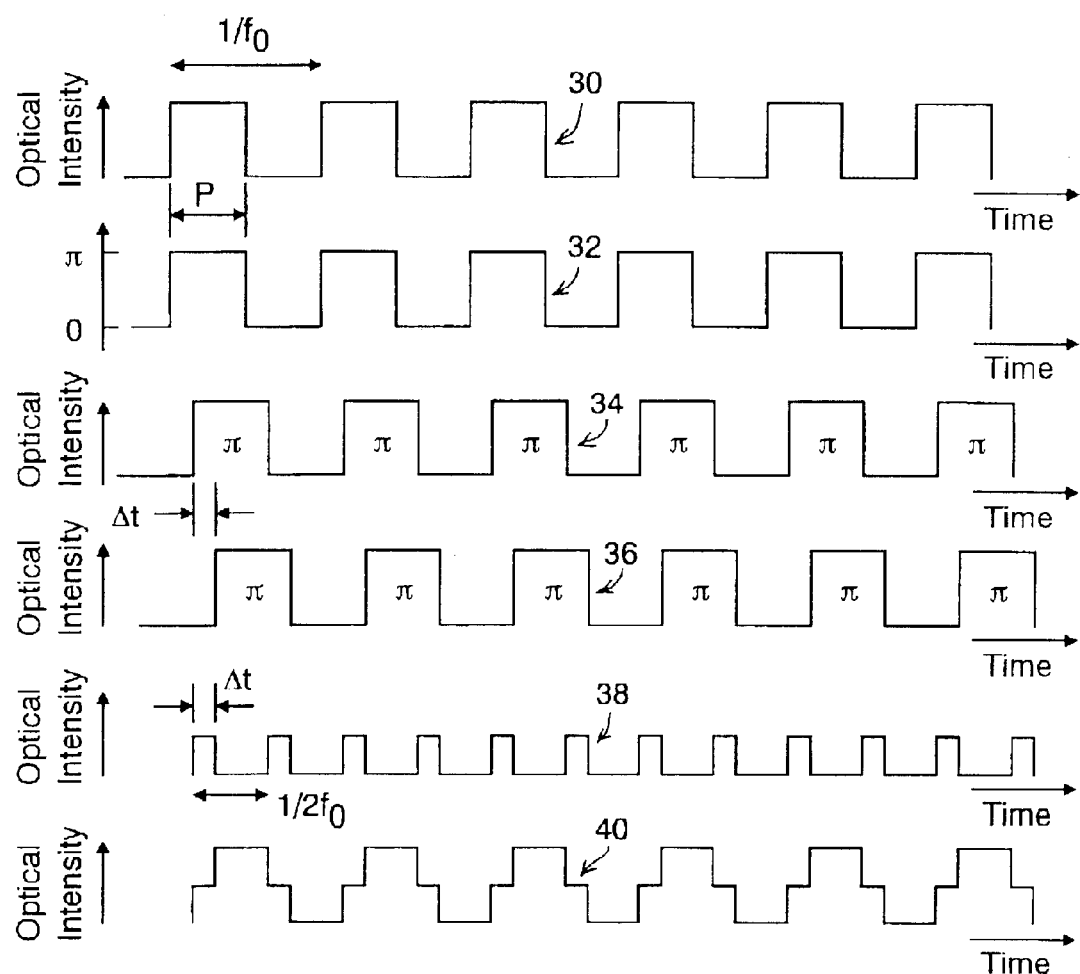
FIG. 2 shows a timing chart of the first embodiment.

FIG. 1 shows a schematic block diagram of a first embodiment according to the invention, and FIG. 2 shows a timing chart of the embodiment.

An optical clock generator 10 outputs an optical clock pulse 30 (FIG. 2) of linear polarization having a pulse width P and frequency fo for a phase modulator 12. In this embodiment, a satisfactory duty factor of an optical clock pulse output from the optical clock pulse generator 10 is approximately 50% because an optical pulse width can be selected and adjusted through an undermentioned polarization mode dispersion device 16.

The phase modulator 12 applied with a direct voltage $V_{DC}$ is driven by an optical clock pulse from the optical cock pulse generator 10 to shift a phase of the optical clock pulse itself by π. In other words, the power of the optical clock pulse output from the optical clock pulse generator 10 and bias voltage $V_{DC}$ are set so that the phase modulator 12 shifts the optical phase of optical pulse duration or optical pulse period of the optical clock pulse output from the optical clock pulse generator 10 by π. A waveform 32 shown in FIG. 2 shows a phase variation of an output light from the phase modulator 12. The phase modulator 12 comprises for example a semiconductor optical amplifier (SOA) or electroabsorption optical modulator (EA modulator).

The output light from the phase modulator 12 enters the polarization mode dispersion device (ex. birefringent medium) 16 through a polarization controller 14. Assuming that a time difference between an ordinary ray and an extraordinary ray of the polarization mode dispersion device 16 is Δt. Here, to make it easily understandable, At is defined to be smaller than P. As described below, more generally, At does not necessarily stay within the pulse width P of the optical clock pulse entering the polarization mode dispersion device 16, but it can be equivalent to one cycle 1/fo of the optical clock pulse or more.

The polarization controller 14 controls the output light from the phase modulator 12 so that its polarization direction inclines at an angle of 45° against the polarization direction of the ordinary ray (or extraordinary ray) of the polarization mode dispersion device 16. When the polarization of the output light from the phase modulator 12 is stably kept in the status inclined at an angle of 45° against the polarization direction of the ordinary ray (or extraordinary ray) of the polarization mode dispersion device 16, the polarization controller 14 should be omitted.

The polarization mode dispersion device 16 divides the incident light (practically the optical clock pulse output from the phase modulator 12) into two polarization components orthogonal to each other and outputs the respective components at a time difference Δt.

The waveform 34 shown in FIG. 2 illustrates for example an ordinary ray (or an extraordinary ray) component output from the polarization mode dispersion device 16, and a waveform 36 illustrates an extraordinary ray (or an ordinary ray) component output from the polarization mode dispersion device 16.

The output light from the polarization mode dispersion device 16 enters a polarization beam splitter (PBS) 20 through a polarization controller 18. The polarization controller 18 controls the output light from the polarization mode dispersion device 16 so that a polarization direction of the ordinary ray (or the extraordinary ray) component output from the polarization mode dispersion device 16 inclines at an angle of 45° against a polarization direction of the polarization beam splitter 20. When the polarization direction of the ordinary ray (or extraordinary ray) component output from the polarization mode dispersion device 16 is stably kept in the condition inclined at an angle of 45° against the polarization direction of the polarization beam splitter 20, the polarization controller 18 should be omitted.

Since the polarization direction of the polarization beam splitter 20 is inclined at an angle of 45° against the polarization direction of the ordinary ray (or extraordinary ray) component output from the polarization mode dispersion device 16, the polarization beam splitter 20 outputs two kinds of optical pulses shown in FIG. 2 for output terminals 22 and 24 according to a combination of optical phase and optical intensity of the input ordinary and extraordinary ray components.

Figure 3:
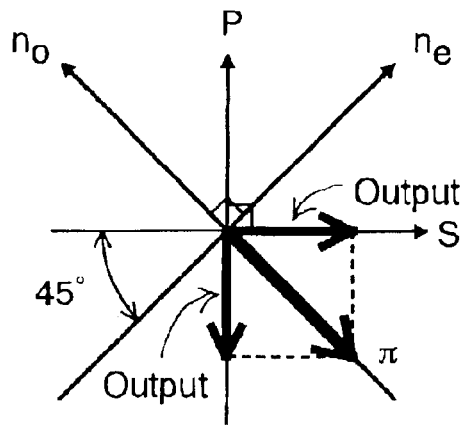
FIG. 3 shows a first relation between ordinary and extraordinary rays of an input light and polarizations S and P of an output light in a polarization beam splitter 20.
Figure 4:
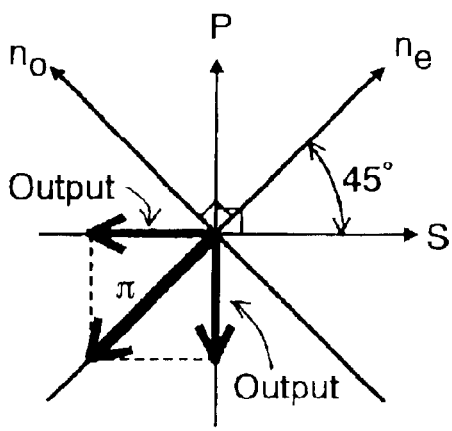
FIG. 4 shows a second relation between ordinary and extraordinary rays of an input light and polarizations S and P of an output light in a polarization beam splitter 20.
Figure 5:
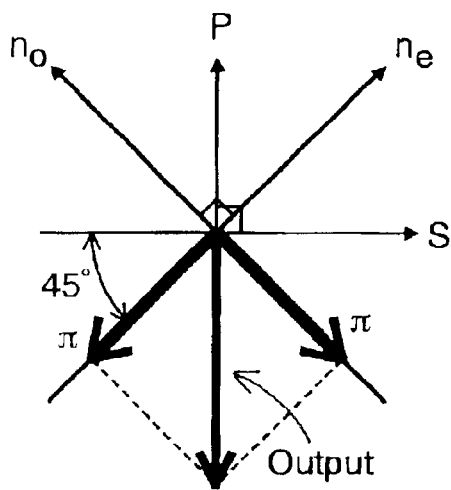
FIG. 5 shows a third relation between ordinary and extraordinary rays of an input light and polarizations S and P of an output light in a polarization beam splitter 20.

FIGS. 3, 4, and 5 respectively show a relation between polarization directions S and P of the polarization beam splitter 20 and polarization directions of incident ordinary and extraordinary ray components. The operation of the polarization beam splitter 20 is explained below referring to FIGS. 3, 4, and 5.

In the part where optical pulses of ordinary and extraordinary ray components are overlapping, there are three types of status, that is, the first status (FIG. 3) wherein the ordinary ray has optical pulses of phase π while the extraordinary ray has no optical pulse, the second status (FIG. 5) wherein both ordinary and extraordinary rays have optical pulses of phase π, and the third status (FIG. 4) wherein the ordinary ray has no optical pulse while the extraordinary ray has optical pulses of phase π. As readily understandable from FIG. 2, the period of the first status is Δt, the second status P-Δt, and the third status Δt.

In the first status, as shown in FIG. 3, the polarization beam splitter 20 splits the ordinary ray component into the polarization S and the polarization P orthogonal to the polarization S and outputs the polarizations S and P for the output terminals 22 and 24 respectively. In FIG. 2, the waveform 38 shows an optical clock pulse waveform of the polarization S output from the output terminal 22, and the waveform 40 shows an optical clock pulse waveform of the polarization P output from the output terminal 24. In the first status (the period of Δt), both output terminals 22 and 24 have optical pulses.

In the second status, both ordinary and extraordinary rays have optical pulses of phase a and therefore the polarization beam splitter 20 outputs optical pulses, in which the ordinary and extraordinary rays are multiplexed, containing exclusively the polarization P as shown in FIG. 5. Accordingly, in the second status (the period of P-Δt), although amplitude of the optical pulse output from the output terminal 24 doubles the amplitude in the first status shown as the waveform 40, the output terminal 22 has no optical pulse shown as the waveform 38.

In the third status, the optical intensity is identical to that of the first status although the phase relation is opposite, and the polarization beam splitter 20 splits the extraordinary ray component into the polarization S and the polarization P orthogonal to the polarization S and outputs the polarizations S and P for the output terminal 22 and 24 respectively as shown in FIG. 4. In the third status (the period of Δt), both output terminals 22 and 24 have optical pulses.

As described above, an optical clock pulse having a pulse width Δt and frequency 2fo, illustrated as the waveform 38, is obtained from the polarization S output from the polarization beam splitter 20. The pulse width Δt is changeable through the polarization mode dispersion device 16. That is, in this embodiment, the optical pulse width can be set far easily compared to prior art. In principle, a duty factor can be set any level within a range of approximately 0 to 100%.

Although the embodiment using the polarization beam splitter 20 was described above to make an output waveform easily understandable, a polarizer for extracting the polarization S is also applicable instead of the polarization beam splitter 20.

Secondly, an embodiment to obtain optical clock pulses of a multiple frequency having complementary optical pulse waveforms is described below.

Figure 6:
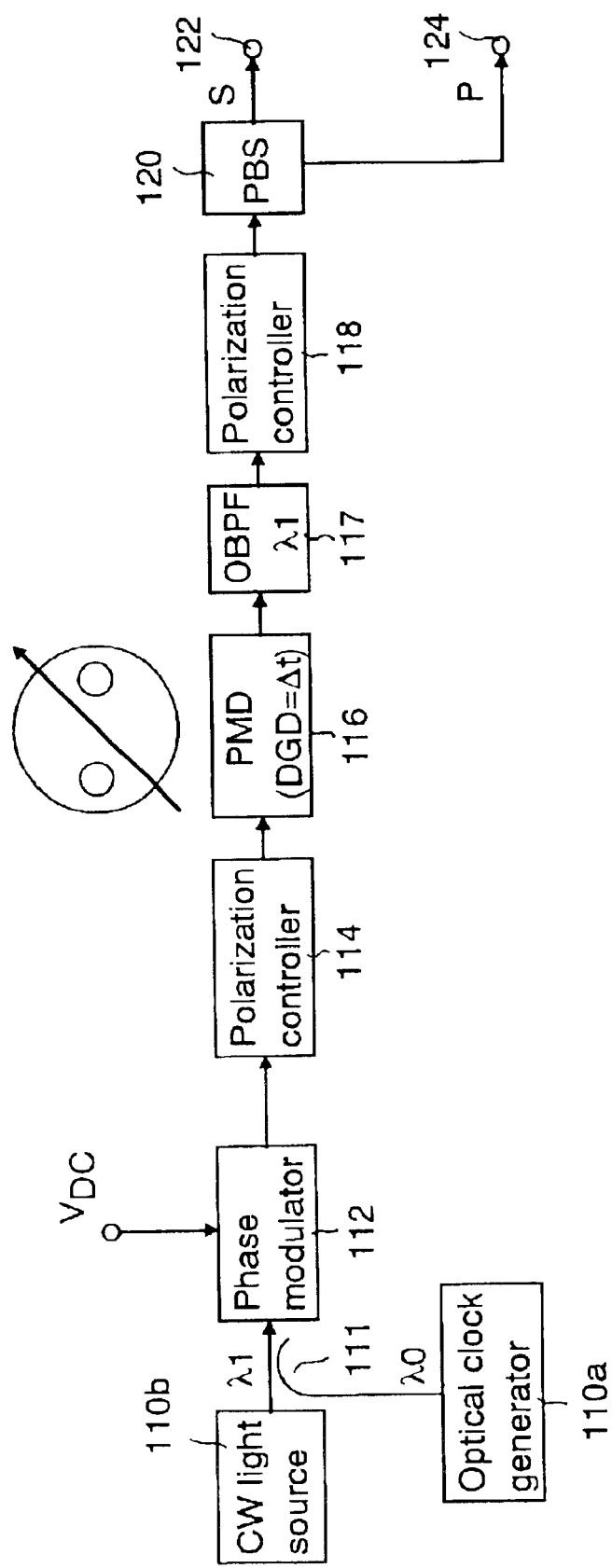
FIG. 6 shows a schematic block diagram of a second embodiment according to the invention.
Figure 7:
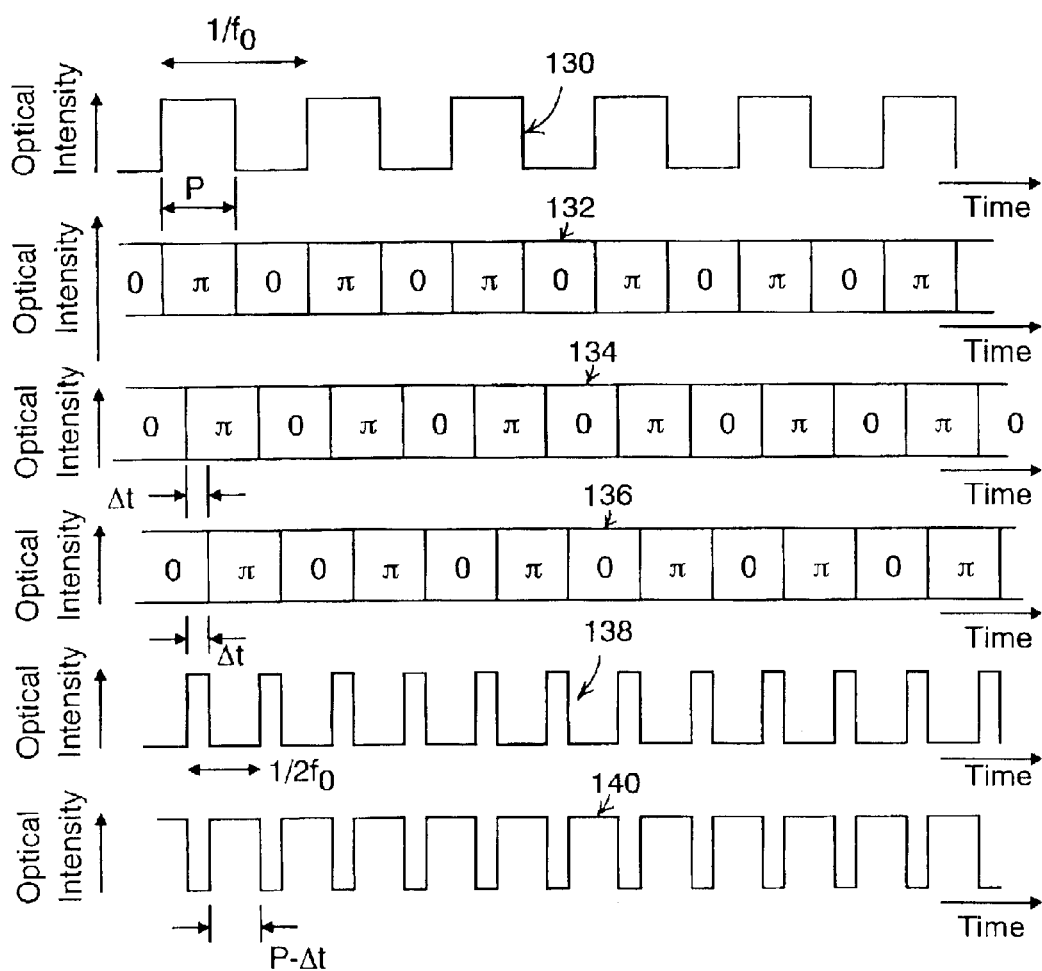
FIG. 7 shows a timing chart of the second embodiment.

FIG. 6 shows a schematic block diagram of a second embodiment, and FIG. 7 shows a timing chart of the embodiment.

An optical clock generator 110a generates a linear polarization optical clock pulse 130 (FIG. 7) of a wavelength λ0, pulse width P and frequency fo, and a CW light source 110b outputs a continuous wave light of a wavelength λ1 different from the wavelength λ0. A WDM optical coupler 111 couples the output light from the optical clock generator 110a and output light from the CW light source 110b and applies the coupled light to a phase modulator 112. In the embodiment, since a polarization mode dispersion device 116 which is described below can select and adjust an optical pulse width, a duty factor of the optical clock pulse output from the optical clock pulse generator 110a is satisfactory if it is around 50%.

Similarly to the phase modulator 12, the phase modulator 112 is applied with the direct voltage $V_{DC}$, and the optical clock output from the optical clock generator 110a and CW light output from the CW light source 110b enter the phase modulator 112 through the WDM optical coupler 111. The phase modulator 112 modulates the phase of the CW light output from the CW light source 110b according to intensity fluctuation of the optical clock output from the optical clock generator 110a. The bias voltage $V_{DC}$ is set so that a phase difference of phase modulation received by the CW light becomes π between the period in which an optical pulse of the optical clock from the optical clock generator 110a does not exist and period in which the optical pulse exists. With this setting, the light of wavelength λ1 output from the phase modulator 112 is phase-modulated as a waveform 132 shown in FIG. 7. The phase modulator 112, similarly to the phase modulator 12, comprises a semiconductor optical amplifier (SOA) or electroabsorption optical modulator (EA modulator).

The output light from the phase modulator 112 enters a polarization mode dispersion device (ex. birefringent medium) 116 through a polarization controller 114. In the output light from the phase modulator 112, an optical clock pulse component of wavelength λ0 is not used afterward and thus may be removed by disposing a WDM optical coupler between the phase modulator 112 and polarization controller 114.

Assuming that the polarization mode dispersion device 116, similarly to the polarization mode dispersion device 16, has a time difference Δt between ordinary and extraordinary rays. Similarly to the first embodiment, Δt is smaller than P. As described below, more generally, Δt does not necessarily stay within the pulse width P of the optical clock pulse entering the polarization mode dispersion device 116, but it could be equivalent to one cycle 1/fo of the optical clock pulse or more.

The polarization controller 114 controls a polarization of the CW light of wavelength λ1 output from the phase modulator 112 so as to incline at an angle of 45° against a polarization direction of an ordinary ray (or an extraordinary ray) from the polarization mode dispersion device 116. When the polarization of the CW light of wavelength λ1 output from the phase modulator 112 is kept in the status inclining at an angle of 45° against a polarization direction of the ordinary ray (or the extraordinary ray) from the polarization mode dispersion device 116, the polarization controller 114 could be omitted.

The polarization mode dispersion device 116 divides an incident light (practically, a phase-modulated CW light of wavelength λ1 output from the phase modulator 112) into two polarization components orthogonal to each other and outputs the divided components at a time difference of Δt. In FIG. 7, a waveform 134 represents, for example, an ordinary ray (or an extraordinary ray) component of wavelength λ1 output from the polarization mode dispersion device 116, and a waveform 136 represents an extraordinary ray (or an ordinary ray) component output from the polarization mode dispersion device 116.

The output light from the polarization mode dispersion device 116 enters a polarization beam splitter (PBS) 120 through an optical bandpass filter 117 for transmitting exclusively the wavelength λ1 and blocking the wavelength λ0 and polarization controller 118. In such case that the optical clock pulse component of wavelength λ0 is removed between the phase modulator 112 and polarization controller 114, the optical bandpass filter 117 is unnecessary in principle.

The polarization controller 118 controls a polarization of output light from the optical bandpass filter so that the polarization direction of the ordinary ray (or the extraordinary ray) component of wavelength λ1 of the polarization mode dispersion device 116 output from the optical bandpass filter 117 inclines at an angle of 45° against the polarization direction of the polarization beam splitter 120. When the polarization direction of the ordinary ray (or the extraordinary ray) component of wavelength λ1 of the polarization mode dispersion device 116 output from the optical bandpass filter 117 is kept in the status inclining at an angle of 45° against the polarization direction of the polarization beam splitter 120, the polarization controller 118 could be omitted.

The polarization direction of the polarization beam splitter 120 inclines at an angle of 45° against a polarization direction of an ordinary ray (or an extraordinary ray) component of wavelength λ1 of the polarization mode dispersion device 116 output from the optical bandpass filter 117 and thus the polarization beam splitter 120 outputs two types of complementary optical pulses having multiple frequencies illustrated as waveforms 138 and 140 in FIG. 7 for output terminals 122 and 124 according to the combination of optical phases of the ordinary and extraordinary ray components.

FIGS. 8, 9, 10, and 11 respectively show a relation between polarization directions S and P of the polarization beam splitter 120 and polarization directions of incident ordinary and extraordinary ray components. The operation of the polarization beam splitter 120 is described below referring to FIGS. 8 to 11.

Figure 8:
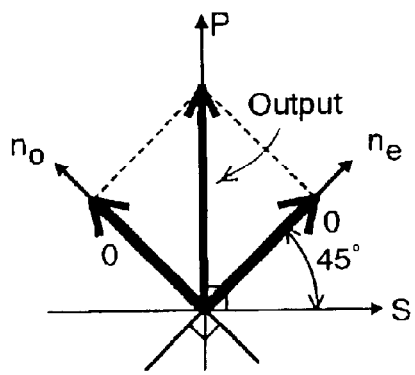
FIG. 8 shows a first relation between ordinary and extraordinary rays of an input light and polarizations S and P of an output light in a polarization beam splitter 120.
Figure 9:
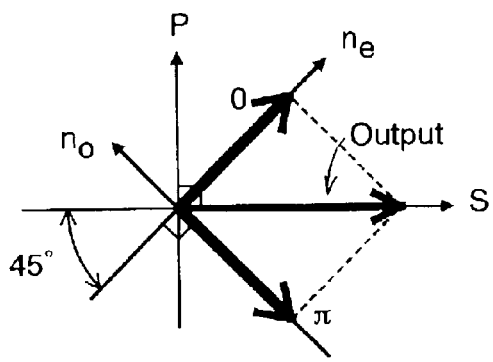
FIG. 9 shows a second relation between ordinary and extraordinary rays of an input light and polarizations S and P of an output light in a polarization beam splitter 120.
Figure 10:
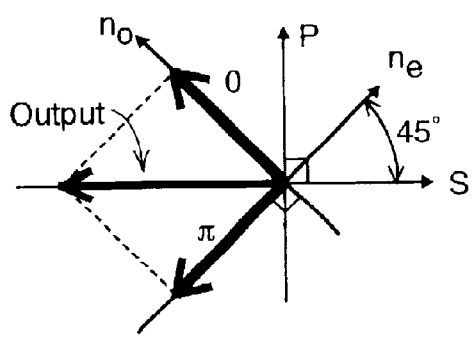
FIG. 10 shows a third relation between ordinary and extraordinary rays of an input light and polarizations S and P of an output light in a polarization beam splitter 120.
Figure 11:
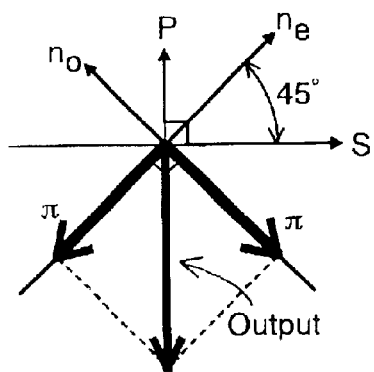
FIG. 11 shows a fourth relation between ordinary and extraordinary rays of an input light and polarizations S and P of an output light in a polarization beam splitter 120.

As obviously from the waveforms 134 and 136 shown in FIG. 7, the ordinary and the extraordinary ray components have a time difference Δt, and accordingly four types of phase combinations as (0, 0), (π, 0), (0, π) and (π, π) exist between the ordinary and extraordinary rays. FIG. 8 shows the case of (0, 0), FIG. 9 the case of (π, 0), FIG. 10 the case of (0, π), and FIG. 11 the case of (π, π).

As clearly from the waveforms 134 and 136, the phase of the incident light of the polarization beam splitter 120 cyclically varies in order of (0, 0), (π, 0), (π, π), and (0, π). As a result, the output terminal 122 outputs an optical clock pulse (a waveform 138) having an optical pulse width Δt and frequency 2fo, and the output terminal 124 outputs an optical clock pulse (a waveform 140) having an optical pulse width P-Δt and frequency 2fo. That is, two types of optical clock pulses having a multiple frequency and complementary waveform can be obtained simultaneously. It is obvious that a polarizer to select a corresponding polarization direction should be disposed instead of the polarization beam splitter 120 when an optical clock pulse of one waveform alone is necessary.

The pulse widths Δt and P-Δt are changeable through the polarization mode dispersion device 116. That is, in this embodiment, it is possible to change an optical pulse width much easily compared to prior art. In principle, a duty factor could be set to any level within a range of approximately 0% to approximately 100%. As a further merit, since the wavelength conversion is used, a wavelength of the output optical pulse clock is flexibly selected.

The optical bandpass filter 117 could be disposed any one of those locations between the phase modulator 112 and polarization controller 114, between the polarization controller 114 and polarization mode dispersion device 116, and between the polarization controller 118 and polarization beam splitter 120.

Figure 12:
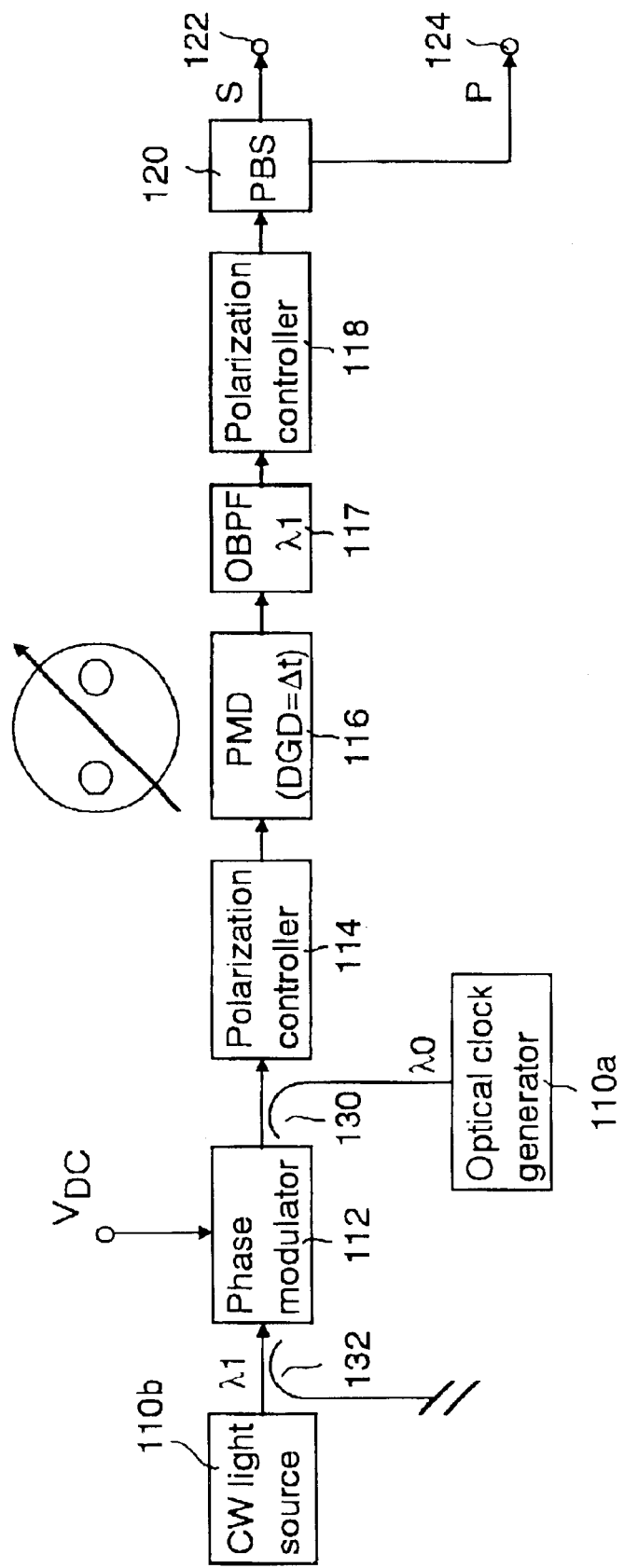
FIG. 12 shows a schematic block diagram of a third embodiment according to the invention.

In the embodiment shown in FIG. 6, although the CW light of wavelength λ1 and optical clock pulse of wavelength λ0 entered the phase modulator 112 in the same direction, it is also applicable that those lights enter the phase modulator 112 so as to propagate in the opposite directions. FIG. 12 shows a schematic block diagram of the modified embodiment. Identical elements are labeled with reference numerals same to those in FIG. 6.

In the configuration shown in FIG. 12, a WDM optical coupler 130 is disposed between the phase modulator 112 and polarization controller 114, and the output light from the optical clock pulse generator 110a enters the phase modulator from the behind. With this configuration, the optical bandpass filter 117 to selectively transmit the wavelength λ1 becomes unnecessary. However, since there is a possibility that reflection exists on an end face of the phase reflector 112, the optical bandpass filter 117 is useful to remove the reflection light. As similarly to the second embodiment, the optical bandpass filter 117 could be disposed any one of those locations between the WDM optical coupler 130 and polarization controller 114, between the polarization controller 114 and polarization mode dispersion device 116, and between the polarization controller 118 and polarization beam splitter 120.

When the CW light of wavelength λ1 and optical clock pulse of wavelength λ0 propagate in the opposite direction in the phase modulator 112, there is a possibility that the optical clock pulse of wavelength λ0 unabsorbed at the phase modulator 112 enters the CW light source 110b and disarranges the wavelength of the CW light source 110b. To avoid such a situation, a WDM optical coupler 132 is disposed between the CW light source 110b and phase modulator 112 to emit the component of wavelength λ0 from the phase modulator 112 toward the outside.

The time difference Δt of the polarization mode dispersion devices 16 and 116 is not necessarily required to keep a value within the pulse width P of an optical clock pulse which enters the polarization mode dispersion devices 16 and 116, but it could be equal to or larger than one cycle 1/fo of the optical clock pulse. In the output of the polarization mode dispersion devices 16 and 116, even an ordinary ray component of an optical clock pulse and an extraordinary ray component of an optical clock pulse adjacent to or separated two or more pulses from the said optical clock pulse are overlapped each other in the time domain, an operation effect identical to the aforementioned effect is obtained. In this case, a value obtained by subtracting n×1/fo from Δt substantially becomes a polarization mode dispersion amount of the polarization mode dispersion device 16, 116.

As readily understandable from the aforementioned explanation, according to the invention, optical clock multiple is realized wherein an optical pulse width is flexibly changeable.

While the invention has been described with reference to the specific embodiment, it will be apparent to those skilled in the art that various changes and modifications can be made to the specific embodiment without departing from the spirit and scope of the invention as defined in the claims.

What is claimed is:

1. An optical clock multiplier comprising:
   a phase modulator to shift a phase in pulse duration of an input optical clock pulse by π;

a polarization mode dispersion device having a predetermined time difference between first and second polarizations orthogonal to each other to divide an output light from the phase modulator into first and second polarization components; and a polarization device to extract one of polarization components in a third polarization practically inclined at an angle of 45° against the first polarization and a fourth polarization orthogonal to the third polarization out of the output light from the polarization mode dispersion device.

2. The multiplier of claim 1 further comprising polarization controllers on both input and output sides of the polarization mode dispersion device.

3. An optical clock multiplying method comprising steps of:

shifting a phase in pulse period of an input optical clock pulse by it $\pi$;

dividing the phase-shifted input optical clock pulse with a polarization mode dispersion device having a predetermined time difference between first and second polarizations orthogonal to each other into first and second polarization components; and extracting one of polarization components of a third polarization practically inclined at an angle of 45° against the first polarization and a fourth polarization orthogonal to the third polarization out of the first and second polarization components divided at the polarization dividing step.

4. The method of claim 3 further comprising controlling polarization in front and back of the polarization dividing step.

5. An optical clock multiplier comprising:

a CW light source to generate a CW light of first wavelength;

a phase modulator, to which an input optical clock pulse of a second wavelength different from the first wavelength and the output light from the CW light source enter, to give a phase difference $\pi$ between pulse period and non-pulse period of the input optical clock pulse to the CW light;

a polarization mode dispersion device having a predetermined time difference between first and second polarizations orthogonal to each other to divide the light having the first wavelength output from the phase modulator into first and second polarization components; and a polarization device to extract one of polarization components of a third polarization substantially inclined at an angle of 45° against the first polarization and a fourth polarization orthogonal to the third polarization out of the light having the first wavelength output from the polarization mode dispersion device.

6. The multiplier of claim 5 further comprising an optical filter disposed between the phase modulator and polarization device to transmit the first wavelength and to extract the second wavelength.

7. The multiplier of claim 5 further comprising polarization controllers on both input and output sides of the polarization mode dispersion device.

8. The multiplier of claim 5 further comprising an optical coupler to couple the input light clock pulse and output light from the CW light source to apply to the phase modulator.

9. The multiplier of claim 5 further comprising an optical coupler disposed on the output side of the CW light having the first wavelength of the phase modulator to apply the CW light having the first wavelength output from the phase modulator to the polarization mode dispersion device and to apply the input optical clock pulse to the phase modulator.

10. An optical clock multiple method comprising steps of:

generating a CW light having first wavelength from a CW light source;

applying an input optical clock pulse having a second wavelength different from the first wavelength and the CW light output from the CW light source to a phase modulator;

giving a phase difference $\pi$ between pulse period and nonpulse period of the input optical clock pulse to the CW light;

dividing the light having the first wavelength output from the phase modulator into first and second polarization components orthogonal to each other with a polarization mode dispersion device having a predetermined time difference between the first and second polarization components; and extracting one of polarization components of a third polarization substantially inclined at an angle of 45° against the first polarization and a fourth polarization orthogonal to the third polarization out of the light having the first wavelength output from the polarization mode dispersion device.

11. The method of claim 10 further comprising controlling polarization in front and back of the polarization dividing step.

12. The method of claim 10 further comprising combining the input optical clock pulse and the output light from the CW light source to apply to the phase modulator.

13. The method of claim 10 further comprising applying the CW light having the first wavelength output from the phase modulator to the polarization mode dispersion device and applying the input optical clock pulse to the phase modulator with an optical coupler disposed on the output side of the CW light having the first wavelength of the phase modulator.

14. An optical clock multiplier comprising:

a phase modulator coupled to an optical pulse generator, wherein the phase modulator shifts a phase of optical pulses of a first optical clock pulse signal having a first pulse period by $\pi$;

a polarization mode dispersion device optically coupled to the phase modulator, wherein the polarization mode dispersion device generates a dispersion device output signal having a first component at a first polarization and a second component at a second polarization orthogonal to the first polarization, the first and second polarization components having a predetermined time difference; and a polarization beam splitter optically coupled to the polarization mode dispersion device, wherein the polarization beam splitter divides the dispersion device output signal into a second optical pulse signal having a second pulse period and a third optical pulse signal having a third pulse period, and wherein polarization of the second optical pulse signal is orthogonal to polarization of the third optical pulse signal.

15. The multiplier of claim 14 wherein the polarization beam splitter has a polarization direction swept at an angle of about 45 degrees relative to the first polarization of the first component of the dispersion device output signal.

16. The multiplier of claim 15 further comprising polarization controllers on both input and output sides of the polarization mode dispersion device.

17. The multiplier of claim 15 wherein the second pulse period is equal to the predetermined time difference.

18. An optical clock multiplying method comprising steps of:

shifting a phase of pulses in a first optical pulse signal having a first pulse period by $\pi$ to generate a phase shifted signal;

generating a dispersion device output signal from the phase shifted signal, the dispersion device output signal having a first component at a first polarization and a second component at a second polarization orthogonal to the first polarization, the first and second components having a predetermined time difference; and dividing the dispersion device output signal into a second optical pulse signal having a second pulse period and a third optical pulse signal having a third pulse period, and wherein polarization of the second optical pulse signal is orthogonal to polarization of the third optical pulse signal.

19. The method of claim 18 further comprising controlling phase of the phase shifted signal and the dispersion device output signal.

20. The method of claim 18 wherein the second pulse period is equal to the predetermined time difference.

21. An optical clock multiplier comprising:

a phase modulator that modulates phase of a CW light signal at a first wavelength in accordance with pulse-period of an input optical clock at a second wavelength, wherein the phase modulator shifts phase of the CW light signal by a first phase during a pulse period of the input optical clock and a second phase during a non-pulse period of the input optical clock, and wherein the first phase and second phase have a phase difference of $\pi$;

a polarization mode dispersion device coupled to the phase modulator, wherein the polarization mode dispersion device generates a dispersion device output signal at the first wavelength, the dispersion device output signal having a first component at a first polarization and a second component at a second polarization orthogonal to the first polarization, the first and second polarization components having a predetermined time difference; and a polarization beam splitter optically coupled to the polarization mode dispersion device, wherein the polarization beam splitter divides the dispersion device output signal into a first optical signal having a second pulse period and a second optical signal having a third pulse period, and wherein polarization of the first optical signal is orthogonal to polarization of the second optical signal.

22. The multiplier of claim 21 further comprising an optical filter disposed between the phase modulator and polarization device, wherein the optical filter transmits optical signals at the first wavelength and removes optical signals at the second wavelength.

23. The multiplier of claim 21 further comprising polarization controllers on both input and output sides of the polarization mode dispersion device.

24. The multiplier of claim 21 further comprising an optical coupler disposed between the phase modulator and the polarization mode dispersion to apply the phase shifted CW light at the first wavelength output from the phase modulator to the polarization mode dispersion device.

25. The multiplier of claim 21 wherein the second pulse period is equal to the predetermined time difference.

* * * * *

UNITED STATES PATENT AND TRADEMARK OFFICE
CERTIFICATE OF CORRECTION

PATENT NO.   : 6,798,558 B2
DATED        : September 28, 2004
INVENTOR(S)  : Hayashi et al.

It is certified that error appears in the above-identified patent and that said Letters Patent is hereby corrected as shown below:

Column 9,
Line 18, delete "by it π", insert -- by π --.

Signed and Sealed this

Sixteenth Day of August, 2005

JON W. DUDAS
*Director of the United States Patent and Trademark Office*